(12) United States Patent
Matsui

(10) Patent No.: US 10,561,938 B2
(45) Date of Patent: Feb. 18, 2020

(54) SERVER, METHOD OF CONTROLLING A SERVER, AND PROGRAM

(71) Applicant: GREE, Inc., Tokyo (JP)

(72) Inventor: Takaya Matsui, Tokyo (JP)

(73) Assignee: GREE, Inc., Tokyo (JP)

( * ) Notice: Subject to any disclaimer, the term of this patent is extended or adjusted under 35 U.S.C. 154(b) by 34 days.

(21) Appl. No.: 15/628,998

(22) Filed: Jun. 21, 2017

(65) Prior Publication Data

US 2017/0282066 A1 Oct. 5, 2017

Related U.S. Application Data

(63) Continuation of application No. 14/430,986, filed as application No. PCT/JP2013/005534 on Sep. 19, 2013, now Pat. No. 9,764,235.

(30) Foreign Application Priority Data

Sep. 27, 2012 (JP) .................................. 2012-214713

(51) Int. Cl.
*A63F 13/35* (2014.01)
*A63F 13/40* (2014.01)
*A63F 13/537* (2014.01)
*A63F 13/335* (2014.01)

(52) U.S. Cl.
CPC .............. *A63F 13/35* (2014.09); *A63F 13/10* (2013.01); *A63F 13/335* (2014.09); *A63F 13/537* (2014.09); *A63F 2300/204* (2013.01); *A63F 2300/8064* (2013.01)

(58) Field of Classification Search
CPC ........ A63F 13/45; A63F 13/47; A63F 13/533; A63F 13/537
See application file for complete search history.

(56) References Cited

U.S. PATENT DOCUMENTS

| 2007/0135206 | A1 | 6/2007 | Inamura |
| 2008/0020367 | A1 | 1/2008 | Jessop et al. |
| 2012/0036189 | A1 | 2/2012 | Sadamoto |

(Continued)

FOREIGN PATENT DOCUMENTS

| JP | 2005125114 A | 5/2005 |
| JP | 2007159647 A | 6/2007 |
| JP | 2008220984 A | 9/2008 |

(Continued)

OTHER PUBLICATIONS

Myst video game by Cyan, Inc., released publically on Sep. 24, 1993, as evidenced by Wikipedia article downloaded on Sep. 17, 2018.*

(Continued)

*Primary Examiner* — James S. McClellan
(74) *Attorney, Agent, or Firm* — Maier & Maier, PLLC

(57) ABSTRACT

Provided are a server, a method of controlling a server, and a program that can increase the variations on methods for acquiring an item or the like and enhance interest in a game. Included are receiving, from a user, an item change request for changing first item data; displaying, to the user, a selection screen to display a plurality of options after receiving the item change request; and providing the user with second item data when a selected option on the selection screen is a correct answer.

21 Claims, 12 Drawing Sheets

(56) References Cited

U.S. PATENT DOCUMENTS

| | | | |
|---|---|---|---|
| 2012/0202575 A1 | 8/2012 | Matsuno | |
| 2013/0196732 A1 | 8/2013 | Oochi et al. | |

FOREIGN PATENT DOCUMENTS

| | | |
|---|---|---|
| JP | 2011067534 A | 4/2011 |
| JP | 2012-038150 A | 2/2012 |
| JP | 2013156743 A | 8/2013 |
| JP | 2013198590 A | 10/2013 |
| WO | 2004/094015 A1 | 11/2004 |

OTHER PUBLICATIONS

Japanese Office Action dated Jun. 12, 2018, in connection with JP Application No. 2017-116804 (6 pgs., including English translation).

Koji Oba, et al., Enterbrain Mook Dragon Nest Official Technical Guide, 2nd Edition, an ENTA, Inc. brain, Feb. 3, 2011, pp. 48, 80 (3 pgs.).

International Search Report dated Nov. 12, 2013 from corresponding International Patent Application No. PCT/JP2013/005534; 2 pgs.

Monster Collection 'help the elf witch! New event "Elf Knights of Lanan Wood' starting" Famitsu App, [online], Famitsu App, Enterbrain, Inc., Mar. 30, 2012. [retrievel date Oct. 31, 2013, <URL: http://app.famitsu.com/20120330_50225/ >.

"Observations of Gacha, Part 1", Online Game Research Journal Feb. 1, 2012 [retrieval date Oct. 31, 2013] <URL: http/blog.livedoor.jp/borisgoto/archives/52070071.html>.

Japanese Office Action—Official Decision of Refusal dated Feb. 3, 2015. 4 pgs.

Japanese Office Action—Notice of Reasons for Rejection dated Sep. 30, 2014, 3 pgs.

Takeda; Konami Official Books, Broadcasting Powerful Professional Baseball 15, A Perfect Official Guidebook, Konami Digital Entertainment Corporation, Sep. 25, 2008, First edition, p. 369.

Japanese Office Action dated Nov. 8, 2016, in connection with corresponding JP Application No. 2015-094846 (6 pgs., including English translation).

"Item repairing by Takeda", "Konami Official Books Jikkyo Powerful Pro-Yakyuu 15 complete official guide book", first edition, Konami Digital Entertainment Co., Ltd., Sep. 25, 2008, p. 369 (document indicating well known technique) (6 pgs.).

"'Monster collection' Let's help the elf witch! New event 'Fairy Knight of Runanwood' is held", [online], Mar. 30, 2012, Kadokawa Dwango Corporation, Famitsu App, [searched on Oct. 31, 2016], internet <URL: http://app.famitsu.com/20120330_50225/>.

Japanese Office Action dated Mar. 14, 2017, in connection with corresponding JP Application No. 2015-094846 (7 pgs., including English translation).

Cited Document No. 6: Super famikon winning method special Super mario Yoshii island, Keibunsha Corporation, Dec. 21, 1998, p. 13 (document indicating well known technique: newly cited document). (6 pgs.).

Myst video game, by Cyan Inc., first released on Sep. 24, 1993 as evidenced by wikipedia article.

Office Action dated Feb. 12, 2019 in corresponding Japanese Application No. 2017-116804; 10 pages.

* cited by examiner

FIG. 2

| Item identification information | Item name | Item type |
|---|---|---|
| UNI1 | Item A | 3 |
| UNI2 | Item B | 1 |
| UNI3 | Item C | 2 |
| UNI4 | Item D | 5 |
| UNI5 | Item E | 1 |
| UNI6 | Item F | 6 |
| UNI7 | Item G | 8 |
| UNI8 | Item H | 3 |
| UNI9 | Item I | 4 |
| UNI10 | Item J | 7 |
| UNI11 | Item K | 2 |
| ... | ... | ... |

| Item identification information | Item image |
|---|---|
| UNI1 | Item A image |
| UNI2 | Item B image |
| UNI3 | Item C image |
| UNI4 | Item D image |
| UNI5 | Item E image |
| ... | ... |

| Number of correct answer selections | Item type |
|---|---|
| 1~3 | 3 |
| 4~5 | 4 |
| 6~7 | 5 |
| 8~9 | 6 |
| 10 | 7 |
| ... | ... |

115

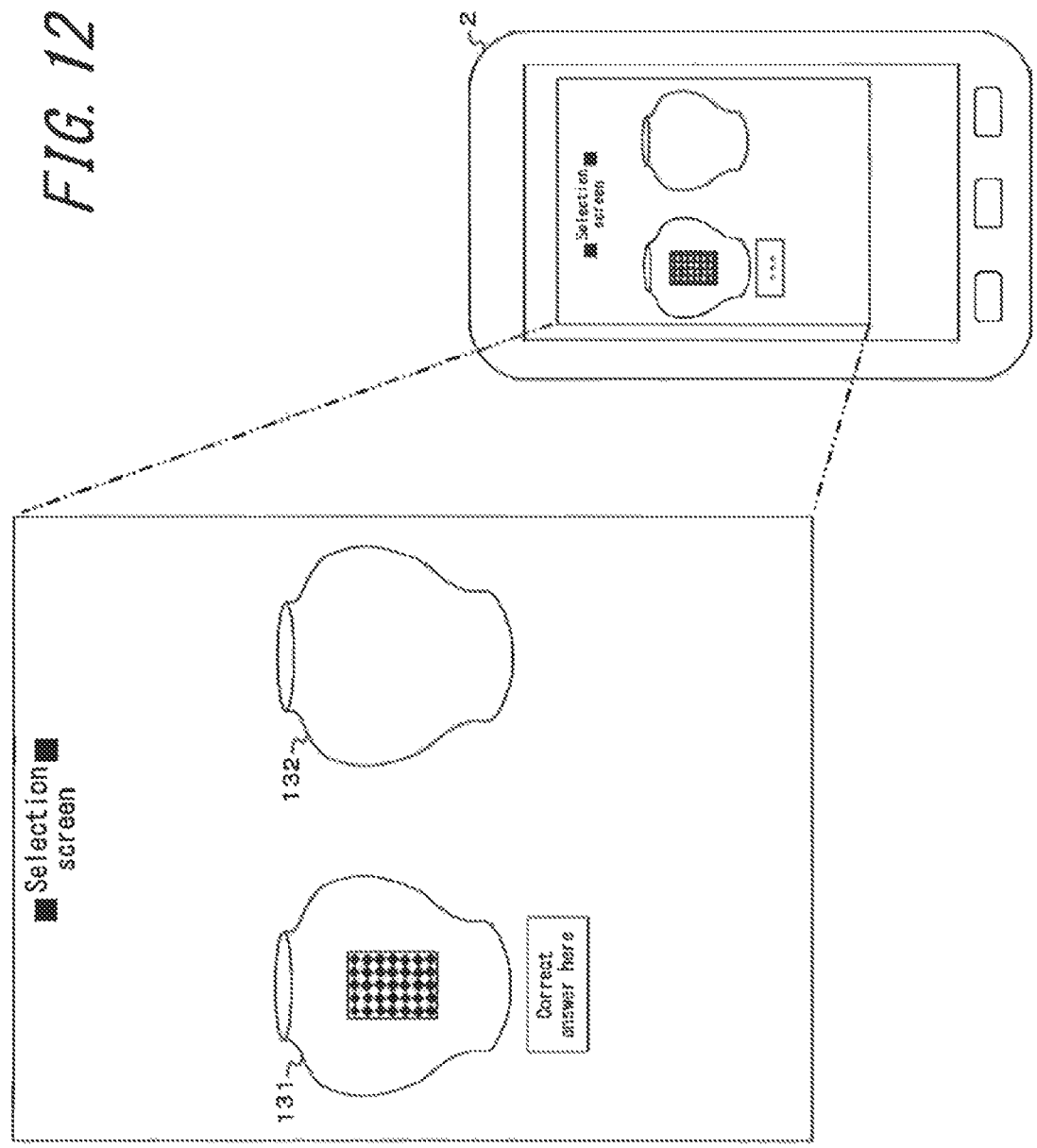

SERVER, METHOD OF CONTROLLING A SERVER, AND PROGRAM

CROSS-REFERENCE TO RELATED APPLICATIONS

This application claims priority from U.S. patent application Ser. No. 14/430,986, filed on Mar. 25, 2015, entitled "SERVER, METHOD OF CONTROLLING A SERVER, AND PROGRAM," which is a national phase application of International Patent Application No. PCT/JP2013/005534, filed on Sep. 19, 2013, which claims priority to and the benefit of Japanese Patent Application No. 2012-214713, filed on Sep. 27, 2012, the entire contents of which are hereby incorporated by reference.

FIELD

Embodiments of the present disclosure relates to a server that provides a game, to a method of controlling a server, and to a program.

BACKGROUND

Conventionally, in a battle game server, each user's deck is formed by a plurality of battle cards or the like stored for each user, and the battle game server allows a plurality of users to compete with each other based on the total value of the attack strength and defense strength of the deck (for example, see JP 2008-220984 A (PTL 1)). In such a battle game server, the user acquires a battle card by methods such as purchasing the battle card.

In a conventional battle game server, however, the methods for acquiring battle cards and the like are limited, causing the user to lose interest in the game. In particular, since it is difficult to acquire a battle card or the like with a high rarity value, the user ends up with the impression that such an item cannot be acquired at all and suffers a drastic loss of interest in the game.

Exemplary embodiments of present disclosure have been conceived in light of the above circumstances and therefore provides a server, a method of controlling a server, and a program that can increase the variations on methods for acquiring a battle card or the like and enhance interest in the game.

SUMMARY

A server according to exemplary embodiments of the present disclosure includes: a communication unit receiving, from a user, an item change request for changing first item data; a display for displaying, to the user, a selection screen to display a plurality of options when the reception means receives the item change request; and a control unit and the communication unit on the server for providing the user with second item data when a selected option on the selection screen is a correct answer.

In the server, a rarity value of the second item data may be higher than a rarity value of the first item data.

When the selected option is not the correct answer, the server may provide the user with the first item data without changing the first item data.

The server may further receive an item change request for changing the second item data from the user and change item data a plurality of times.

The server may count the number of times the selected option is the correct answer, and when the number of times is at least a predetermined value, may change the item data to item data with a higher rarity value than when the number of times is less than the predetermined value.

When the selected option is an incorrect answer, the server may provide the user with the item data after changing the item data to the first item data.

When the selected option is an incorrect answer, the server may provide the user with the item data after changing the item data to any previously changed item data.

A method, according to exemplary embodiments of the present disclosure, of controlling a server includes the steps of: receiving, from a user on an operation unit of a communication terminal, a request for changing first item data at a communication unit of the game server; displaying, to the user on a display unit of the communication terminal, a selection screen of data generated by a control unit of the game server that displays a plurality of options from an item data table of a memory unit of the game server, when the request is received; and providing the user with second item data when a selected option on the selection screen is a correct answer as determined by the control unit of the game server based on information stored in an option table in the memory unit.

In the method, a rarity value of the second item data may be higher than a rarity value of the first item data.

In the method, when the selected option is not the correct answer, the server may provide the user with the first item data without changing the first item data.

In the method, the server may further receive an item change request for changing the second item data from the user and change item data a plurality of times.

In the method, the server may count the number of times the selected option is the correct answer, and when the number of times is at least a predetermined value, may change the item data to item data with a higher rarity value than when the number of times is less than the predetermined value.

In the method, when the selected option is an incorrect answer, the server may provide the user with the item data after changing the item data to the first item data.

In the method, when the selected option is an incorrect answer, the server may provide the user with the item data after changing the item data to any previously changed item data.

A program or a computer-readable non-transitory recording medium according to exemplary embodiments of the present disclosure causes a computer functioning as a server to execute the steps of: receiving, from a user on a communication terminal, a request for changing first item data at a communication unit on a game server; displaying, to the user on a display unit of the communication terminal, a selection screen to display a plurality of options determined by a control unit on the game server from data in an item data tables in a memory unit of the game server when the request is received; and providing the user with second item data from an item information table in the memory unit of the game server when a selected option on the selection screen of the communication terminal is a correct answer as determined by the control unit based on values stored in an option table of the memory unit.

In the program, a rarity value of the second item data may be higher than a rarity value of the first item data.

In the program, when the selected option is not the correct answer, the server may provide the user with the first item data without changing the first item data.

In the program, the server may further receive an item change request for changing the second item data from the user and change item data a plurality of times.

In the program, the server may count the number of times the selected option is the correct answer, and when the number of times is at least a predetermined value, may change the item data to item data with a higher rarity value than when the number of times is less than the predetermined value.

In the program, when the selected option is an incorrect answer, the server may provide the user with the item data after changing the item data to the first item data.

In the program, when the selected option is an incorrect answer, the server may provide the user with the item data after changing the item data to any previously changed item data.

A program and a computer-readable non-transitory recording medium according to exemplary embodiments of the present disclosure causes a computer functioning as a communication terminal of a user to execute the steps of: receiving, from the user, an item change request for changing first item data; displaying, to the user, a selection screen to display a plurality of options when the item change request is received in the receiving step; and providing the user with second item data when a selected option on the selection screen is a correct answer.

The server, method of controlling a server, and program according to the present disclosure increase the variations on methods for acquiring a battle card or the like and enhance interest in the game.

BRIEF DESCRIPTION OF THE FIGURES

Exemplary embodiments of the present disclosure will be further described below with reference to the accompanying drawings, wherein:

FIG. 2 is an example of an item information table in Embodiment 1;

FIG. 3 is an example of item data in Embodiment 1;

FIG. 8 is an example of a ranking table in Embodiment 2;

FIG. 12 is another example of a selection screen.

DETAILED DESCRIPTION

The following describes embodiments of the present disclosure.

Embodiment 1

Figure 1:
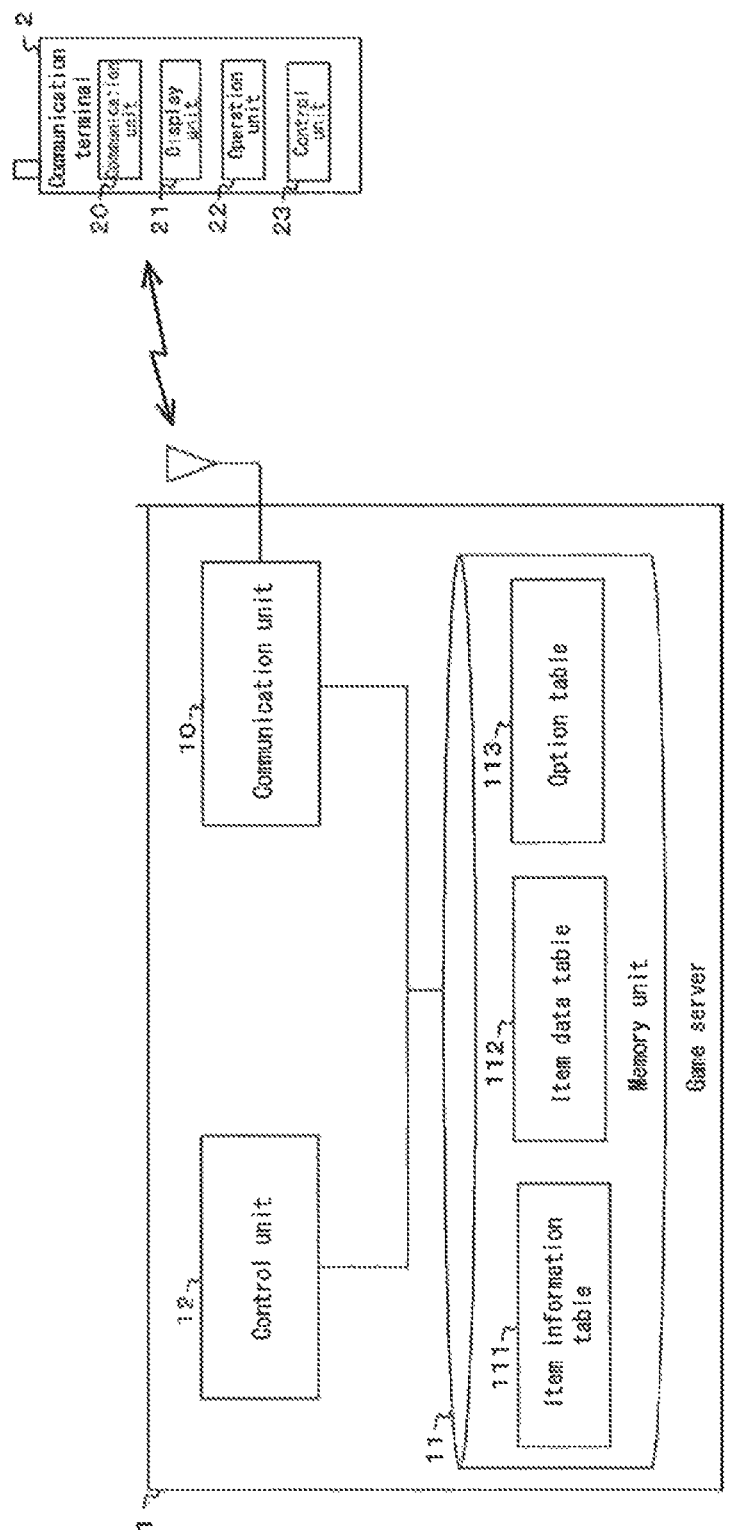
FIG. 1 is a block diagram of a communication system according to Embodiment 1.

FIG. 1 is a block diagram of a communication system according to Embodiment 1 of the present disclosure. The communication system according to Embodiment 1 of the present disclosure includes a server 1 (game server 1) and a communication terminal 2.

The game server 1 includes a communication unit 10, a memory unit 11, and a control unit 12.

The communication unit 10 communicates with a communication terminal 2 over either or both of a wireless and wired connection.

The memory unit 11 stores information on items provided to the communication terminal 2 and on the item type. An "item" refers to any of a variety of objects used within a game, such as battle cards constituting a user's deck, a character, a weapon, armor, an ornament, a plant, food, and the like. The item type is a numerical value representing the rarity value of the item, a numerical value representing the category of the item, or the like. Below, the item type is described as being a numerical value representing the rarity value of the item, yet the item type is not limited in this way.

Specifically, the memory unit 11 stores this information by dividing the information among tables and sets of data. An item information table 111 and an item data table 112 are stored in the memory unit 11. As illustrated in FIG. 2, for example the item information table 111 includes item identification information "UNI1", an item name "item A", and an item type "3". The item identification information is an identifier for uniquely identifying an item in the present system. The item type for example indicates the level of the rarity value of an item. As the value of the item type is larger, the rarity value of the item is higher.

The item data table 112 stores data related to items provided to the user (item data). FIG. 3 illustrates an example of the item data table 112. As illustrated in FIG. 3, the item data for example includes item identification information "UNI1", an item image "item A image", and the like. The image data may be in any image format, such as JPEG, GIF, PNG, or the like.

The memory unit 11 stores information pertaining to options, described below, as an option table 113.

The control unit 12 performs a variety of control pertaining to the game server 1. For example, upon receiving an item acquisition request from the communication terminal 2, the control unit 12 refers to the item information table 111 in the memory unit 11 to extract and determine the item data to transmit to the communication terminal 2. The control unit 12 then transmits the item data to the communication terminal 2. Specifically, the control unit 12 refers to the item data table 112 and transmits the item data (item image and the like) to the communication terminal 2 via the communication unit 10.

For example, the control unit 12 refers to the item information table 111, randomly extracts item identification information (for example, "UNI1"), and determines that the extracted item is the item to provide to the communication terminal 2. The control unit 12 then refers to the item data table 112 and transmits the item data for the item to be provided (first item data) to the communication terminal 2 via the communication unit 10.

Figure 4:
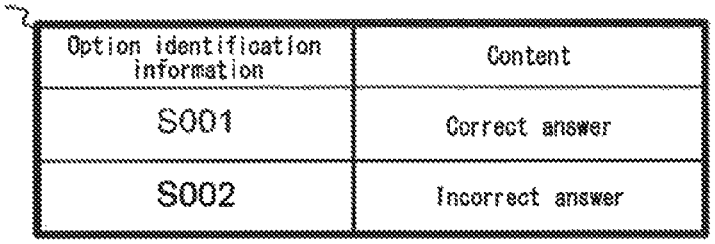
FIG. 4 is an example of an option table in Embodiment 1.

Furthermore, upon receiving an item change request from the communication terminal 2, the control unit 12 generates selection screen data with a plurality of options that include a correct answer and transmits the selection screen data to the communication terminal 2 via the communication unit 10. The control unit 12 determines the information pertaining to the option that is the correct answer in advance and stores the option table 113 in the memory unit 11. FIG. 4 illustrates an example of the option table. As illustrated in FIG. 4, the option table 113 includes option identification information and correct/incorrect information corresponding to the options. The option identification information is an identifier for uniquely identifying an option in the present system. The content of the option is information indicating one of two values, "correct answer" or "incorrect answer". FIG. 4 illustrates an example with two options, yet the number of options may be three or more. FIG. 4 also illustrates an example in which there is only one correct answer, yet the number of correct answers may also be any number that is two or more and is less than the total number of options. Based on the option table 113, the control unit 12 generates the selection screen data to transmit to the communication terminal 2.

Figure 5:
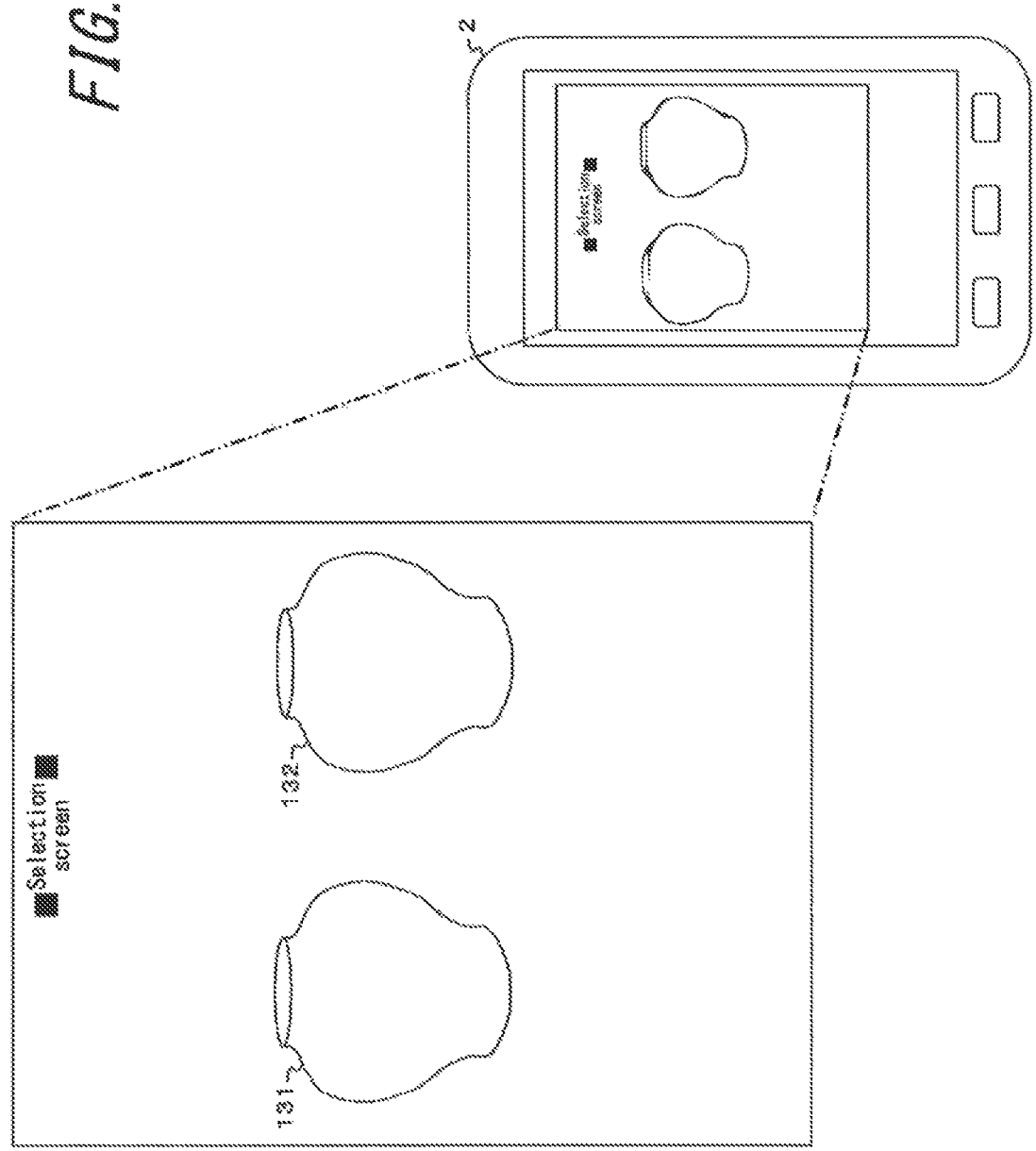
FIG. 5 is an example of a selection screen in Embodiment 1.

FIG. 5 illustrates an example of a selection screen, displayed by the communication terminal 2, for which data is generated by the control unit 12. The selection screen displayed in FIG. 5 is generated based on the option table 113 and includes two options and one correct answer. For example, the option corresponding to the option identification information "S001" is indicated by option image 131, and the option corresponding to the option identification information "S002" is indicated by option image 132. Option image 131 and option image 132 are preferably an image of a vase. Hereinafter, the option image is described as being a vase image. The option image 131 (vase image 131) and the option image 132 (vase image 132) are displayed with the same image, and a user looking at the images cannot tell which one is the correct answer. On the selection screen displayed on the communication terminal 2, a visual effect is preferably applied so that the item before the change is stored inside the vase image, and also so that the vase images are shuffled.

The control unit 12 receives the option identification information corresponding to the option selected by user input from the communication terminal 2 via the communication unit 10. Specifically, the control unit 12 receives the option identification information ("S001" or "S002") pertaining to the vase image corresponding to the option from the communication terminal 2. The control unit 12 then refers to the option table 113 to judge whether the received option identification information is the correct answer.

When judging that the received option identification information is the correct answer, i.e. when the option selected by the user is the correct answer, the control unit 12 changes the item data transmitted to the communication terminal 2 from the first item data to other item data (second item data). Specifically, the control unit 12 refers to the item information table 111, randomly extracts item identification information (for example, "UNI4"), and determines that the extracted item data is the second item data to transmit to the communication terminal 2. Based on the value of the item type of the first item data, preferably the control unit 12 randomly extracts item data with a higher value from the item information table 111 and determines the extracted item data to be the second item data. In other words, the control unit 12 determines the second item data so that the second item data after the change has a rarity value higher than that of the first item data before the change. For example, if the item before the change is item A, the control unit 12 randomly extracts an item for which the value of the item type is greater than three from the item information table 111 and determines the item to be the second item data. A visual effect is preferably applied so that the other item after the change comes out from the vase image on the selection screen displayed by the communication terminal 2.

On the other hand, when the received option identification information is an incorrect answer, i.e. when the option selected by the user is not the correct answer, then without changing the item data, the control unit 12 transmits the original item data, i.e. the first item data, to the communication terminal 2. For example, if the first item data before the change is item A, then without changing the item data, the control unit 12 provides the communication terminal 2 with item A.

The communication terminal 2 includes a communication unit 20, a display unit 21, an operation unit 22, and a control unit 23.

The communication unit 20 communicates with the game server 1 over either or both of a wireless and wired connection. Specifically, based on user operation of the operation unit 22, the communication unit 20 transmits an item acquisition request to the game server 1. Based on user operation of the operation unit 22, the communication unit 20 also transmits an item change request to the game server 1. The communication unit 20 also receives item data from the game server 1 in response to the item acquisition request. Furthermore, the communication unit 20 receives selection screen data from the game server 1 in response to the item change request.

The display unit 21 is configured using a liquid crystal display, an organic EL display, or the like and outputs display pertaining to the game provided by the game server 1. For example, the display unit 21 displays the item image pertaining to an item provided by the game server 1. The display unit 21 also displays a link or the like for transmitting an item change request. The link includes a message such as "try to change an item" or "Choose the vase of growth and stick a card in! If you pick out the real vase, your card will grow!". The display unit 21 also displays a selection screen in response to the item change request.

The operation unit 22 is configured using buttons, a touch panel, or the like, and receives different types of input signals from the user during the game. For example, the operation unit 22 receives user input on the selection screen. The operation unit 22 transmits the selection signal received from the user to the control unit 23.

The control unit 23 performs a variety of control pertaining to the communication terminal 2. For example, based on user operation of the operation unit 22, the control unit 23 transmits an item acquisition request to the game server 1 via the communication unit 20. Based on user operation of the operation unit 22, the control unit 23 also transmits an item change request to the game server 1 via the communication unit 20. Furthermore, the control unit 23 receives a user selection signal on the selection screen and transmits the option identification information that was selected by the user to the game server 1 via the communication unit 20.

Figure 6:
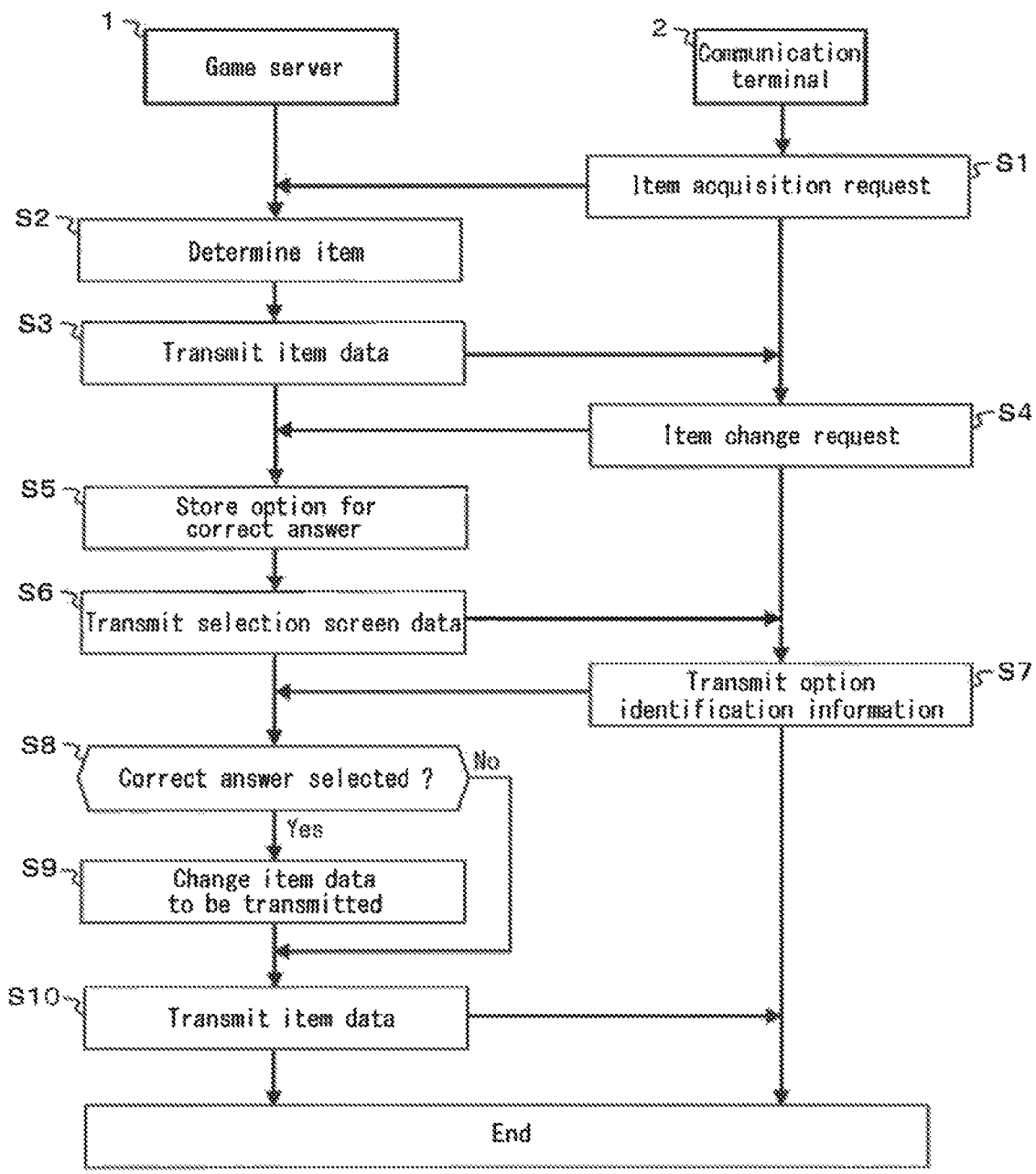
FIG. 6 is a flowchart illustrating operations of the communication system according to Embodiment 1.

Next, operations of the communication system according to Embodiment 1 of the present disclosure are described using the flowchart in FIG. 6.

First, based on user operation of the operation unit 22, the control unit 23 of the communication terminal 2 transmits an item acquisition request to the game server 1 via the communication unit 20 (step S1).

Next, the control unit 12 of the game server 1 refers to the item information table 111 in the memory unit 11 to extract and determine the item to transmit to the communication terminal 2 (step S2). The control unit 12 then transmits the item data pertaining to the item (first item data) to the communication terminal 2 (step S3). Specifically, the control unit 12 refers to the item data table 112 and transmits the item data pertaining to the item to provide to the communication terminal 2 via the communication unit 10.

Next, based on user operation of the operation unit 22, the control unit 23 of the communication terminal 2 transmits an item change request to the game server 1 via the communication unit 20 (step S4). In step S4, when the communication terminal 2 does not transmit an item change request, processing terminates without the item being changed.

Subsequently, upon receiving the item change request, the control unit 12 of the game server 1 determines the information pertaining to the option that is the correct answer and stores the information pertaining to the option that is the correct answer in the option table 113 in the memory unit 11 (step S5). The control unit 12 then generates selection screen data with a plurality of options that include a correct answer and transmits the selection screen data to the communication terminal 2 via the communication unit 10 (step S6).

Subsequently, the control unit 23 of the communication terminal 2 receives a user selection signal on the selection screen and transmits the option identification information that was selected by the user to the game server 1 via the communication unit 20 (step S7).

Next, the control unit 12 of the game server 1 refers to the received option identification information and option table 113 to judge whether or not the option selected by the user is the correct answer (step S8).

When judging that the content of the option in the option identification information is the correct answer, i.e. when judging that the option selected by the user is the correct answer, the control unit 12 changes the item data transmitted to the communication terminal 2 to different item data (second item data) (step S9). Specifically, the control unit 12 refers to the item information table 111, randomly extracts item identification information (for example, "UNI4"), and determines that the item corresponding to the extracted item identification information (item D) is the other item, after the change, to provide to the communication terminal 2. Based on the value of the item type of the item before the change, preferably the control unit 12 randomly extracts an item with a higher value from the item information table 111 and determines the extracted item to be the second item data.

The control unit 12 then transmits the item data to the communication terminal 2 (step S10). Specifically, the control unit 12 refers to the item data table 112 and transmits the item data pertaining to the item to provide to the communication terminal 2 via the communication unit 10. Processing then terminates.

On the other hand, when the control unit 12 judges in step S8 that the content of the option in the option identification information is not the correct answer, i.e. when the control unit 12 judges that the option selected by the user is an incorrect answer, processing skips step S9 and proceeds to step S10. In this case, without the item data to be transmitted to the communication terminal 2 being changed, the original item data is transmitted to the communication terminal 2 in step S10, and processing terminates.

In this way, according to exemplary embodiments of the present disclosure, the communication terminal 2 transmits an item change request for an item that has been provided, the game server 1 transmits selection screen data with a plurality of options that include a correct answer in response to the item change request, and the item is changed in accordance with the option, thereby increasing the variations on methods for acquiring an item. Furthermore, based on the value of the item type of the item before the change, the control unit 12 preferably determines an item of higher value to be the other item, thereby increasing the predictability of acquisition of an item with a high rarity value or the like and heightening interest in the game.

In the present embodiment, the option image is a vase image, yet the option image is not limited to this example. The option image may be the image of a lottery ticket used to select the correct answer. Alternatively, the option image may be a planter, the ground, or the like in which a plant seed is planted, and when the correct answer is selected, a visual effect may be applied so that the option image changes to the image of a flower. The option image may also be an image of a face down card, and a visual effect may be applied so that magic dust is sprinkled on the selected card, with the card turning into the item after the change when the correct answer is selected. The user's interest in the game can be heightened by applying the above-described effects.

Embodiment 2

Figure 7:
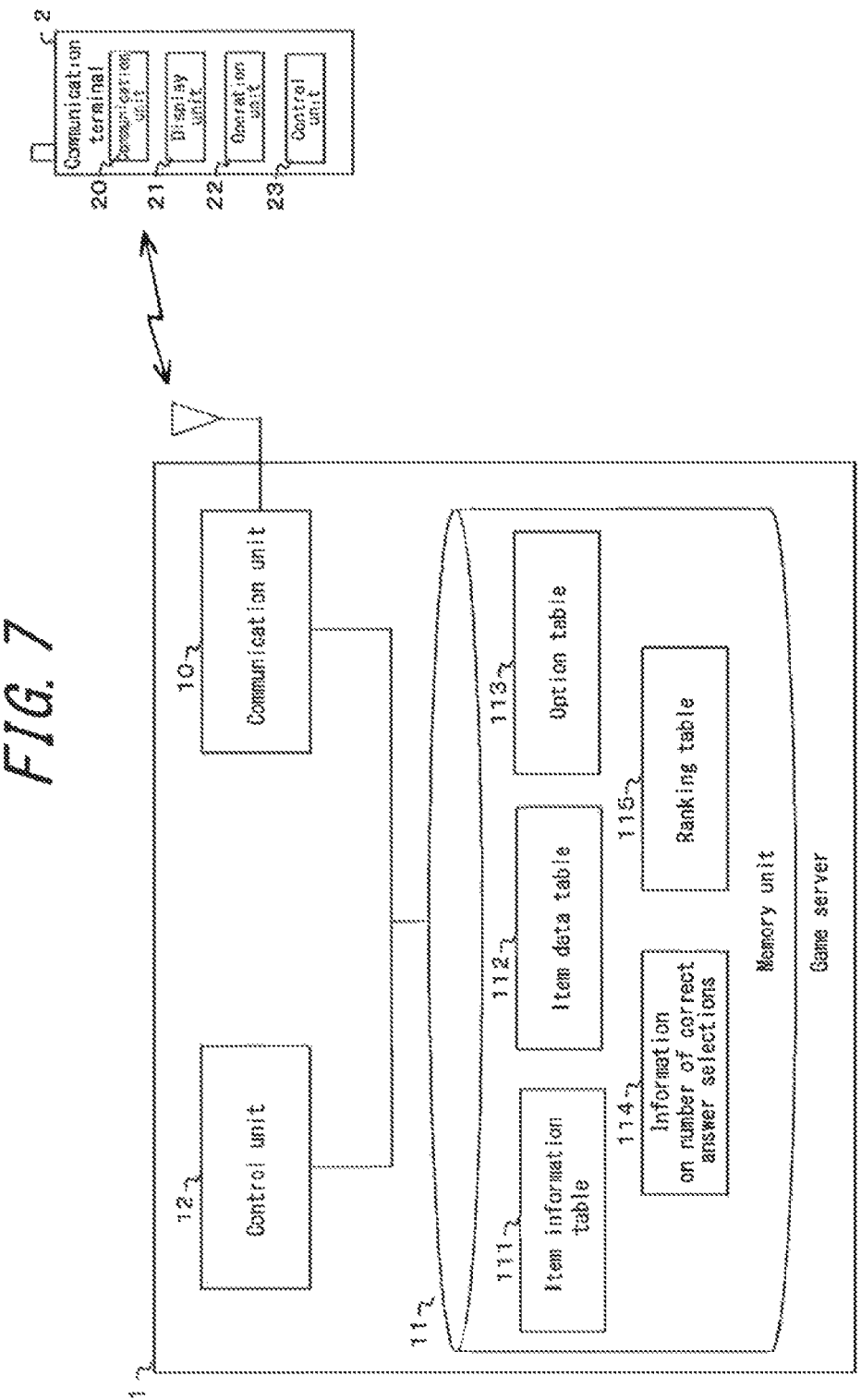
FIG. 7 is a block diagram of a communication system according to Embodiment 2.

The following describes Embodiment 2 of the present disclosure. FIG. 7 is a block diagram of a communication system according to Embodiment 2 of the present disclosure. The same reference signs are provided for the same components as in Embodiment 1, and a description thereof is omitted. Overall, the communication system in Embodiment 2 differs from the structure of Embodiment 1 in that, after the game server 1 transmits the second item data after the change, the communication terminal 2 further transmits an item change request to change the second item data, and the item is changed multiple times in accordance with the number of times the correct answer is selected.

In addition to the structure of the memory unit 11 according to Embodiment 1, the memory unit 11 of the game server 1 according to Embodiment 2 stores information 114 on the number of correct answer selections and a ranking table 115. The information 114 on the number of correct answer selections stores the number of times the correct answer is selected during the item change requests from the communication terminal 2 (number of correct answer selections). The ranking table 115 is a table indicating the relationship between the number of correct answer selections and the item type of the other item after the change.

FIG. 8 illustrates an example of the ranking table 115. For example, when the number of correct answer selections is from 1 to 3, the item type is 3. On the other hand, when the number of correct answer selections is from 4 to 5, the item type is set higher to 4. The control unit 12 refers to the information 114 on the number of correct answer selections and the ranking table 115 in the memory unit 11 and changes the item data transmitted to the communication terminal 2 to other item data. Since the control unit 12 changes the item with reference to the ranking table 115 illustrated in FIG. 8, when the number of correct answer selections is at least a predetermined value, the control unit 12 sets the other item after the change to be an item with a higher rarity value than when the number of correct answer selections is less than the predetermined value.

Figure 9:
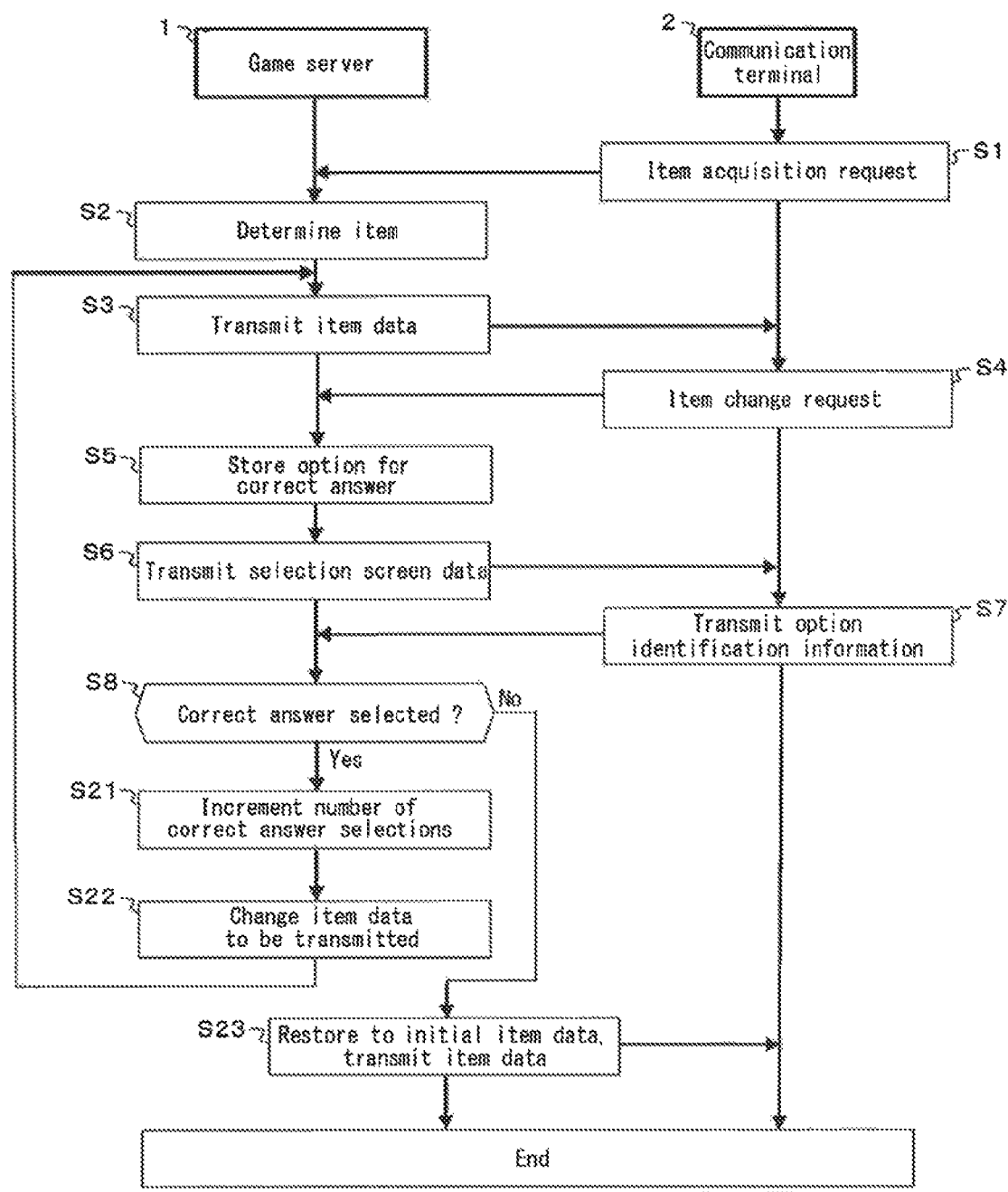
FIG. 9 is a flowchart illustrating operations of the communication system according to Embodiment 2.

Next, operations of the communication system according to Embodiment 2 of the present disclosure are described using the flowchart in FIG. 9. The same reference signs are provided for the same operations as in Embodiment 1, and a description thereof is omitted. In an initial state, the information 114 on the number of correct answer selections is reset to zero.

After steps S1 to S7, when judging in step S8 that the content of the option in the option identification information is the correct answer, i.e. when judging that the option selected by the user is the correct answer, the control unit 12 in the game server 1 of Embodiment 2 increments the number of correct answer selections by one (step S21). The control unit 12 then changes the item data to transmit to the communication terminal 2 to other item data (step S22). At this time, the control unit 12 refers to the item information table 111, the information 114 on the number of correct answer selections, and the ranking table 115 in the memory unit 11 to change the item provided to the communication terminal 2 to another item.

Subsequently, processing returns to step S3, and the control unit 12 transmits the other item data after the change. In other words, as long as the answer is correct in step S8, the communication terminal 2 can repeatedly transmit an item change request to the game server 1 to change the item repeatedly. In step S4, when the communication terminal 2 does not transmit an item change request, processing terminates without the item being changed.

On the other hand, when judging in step S8 that the content of the option in the option identification information is not the correct answer, i.e. when judging that the option selected by the user is an incorrect answer, the control unit 12 restores the item data to be transmitted to the initial item data before the item change (i.e. to the first item data) and transmits the restored first item data (step S23). Processing then terminates.

According to the communication system in Embodiment 2, after the game server 1 has transmitted the second item data after the change, the communication terminal 2 further transmits an item change request to change the second item data, and the item data is changed multiple times, thus allowing for an increase in the variations on methods for acquiring battle cards and the like. Furthermore, by using the ranking table 115, the item changes to a higher rarity value as the number of correct answer selections increases, thereby increasing the predictability of acquisition of a card or other item with a high rarity value or the like and heightening interest in the game.

In step S23 above, the control unit 12 restores the item to be provided to the initial item before the item change, yet processing is not limited to this example. The control unit 12 may instead change the item data to be transmitted to any other previously changed item data. In other words, when the correct answer has been selected multiple times in the past, resulting in multiple item changes, then the item may be changed to any of the items after previous changes. When the user of the communication terminal 2 has a predetermined item, the control unit 12 preferably changes the item to the immediately previous changed item.

Embodiment 3

Figure 10:
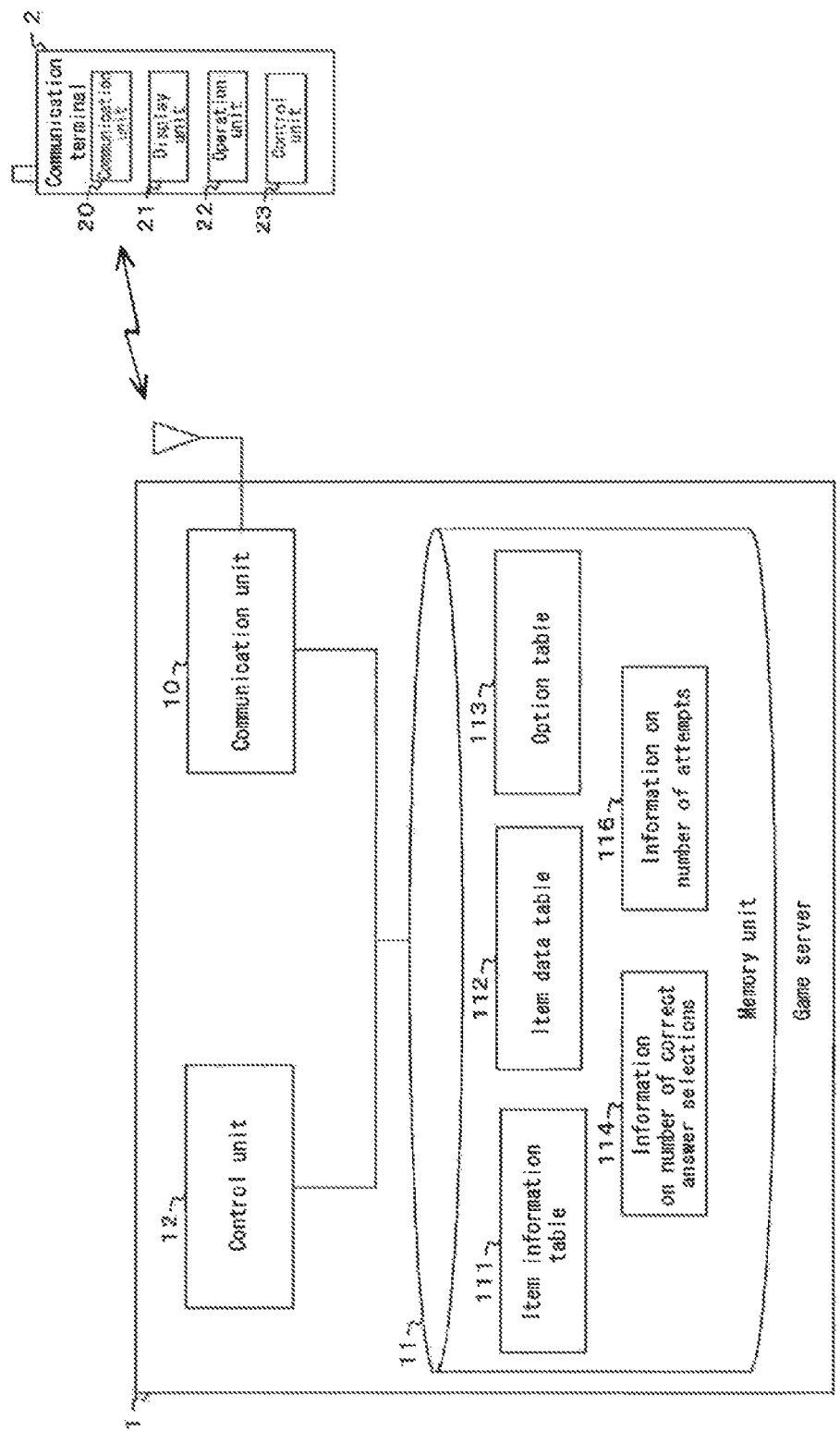
FIG. 10 is a block diagram of a communication system according to Embodiment 3.

The following describes Embodiment 3 of the present disclosure. FIG. 10 is a block diagram illustrating the structure of a communication system according to Embodiment 2 of the present disclosure. The same reference signs are provided for the same components as in Embodiment 1, and a description thereof is omitted. Overall, the communication system in Embodiment 3 differs from the structure of Embodiment 1 in that, upon receiving an item change request, the game server 1 transmits selection screen data with a plurality of options that include a correct answer to the communication terminal 2 a predetermined number of times and then changes the item data based on the number of correct answer selections that are made.

In addition to the structure of the memory unit 11 according to Embodiment 1, the memory unit 11 of the game server 1 according to Embodiment 3 further stores information 114 on the number of correct answer selections and information 116 on the number of attempts. The information 114 on the number of correct answer selections has the same structure as in Embodiment 2. Therefore, the same reference sign is used, and a description is omitted. The information 116 on the number of attempts is information on the number of times the game server 1 has received an item change request from the communication terminal 2.

Based on the information 116 on the number of attempts, the control unit 12 according to Embodiment 3 judges whether the number of attempts has reached a predetermined number. When the number of attempts has reached a predetermined number, the control unit 12 refers to the item information table 111 and the information 114 on the number of correct answer selections in the memory unit 11 and changes the item data to be transmitted to the communication terminal 2 to the second item data.

Figure 11:
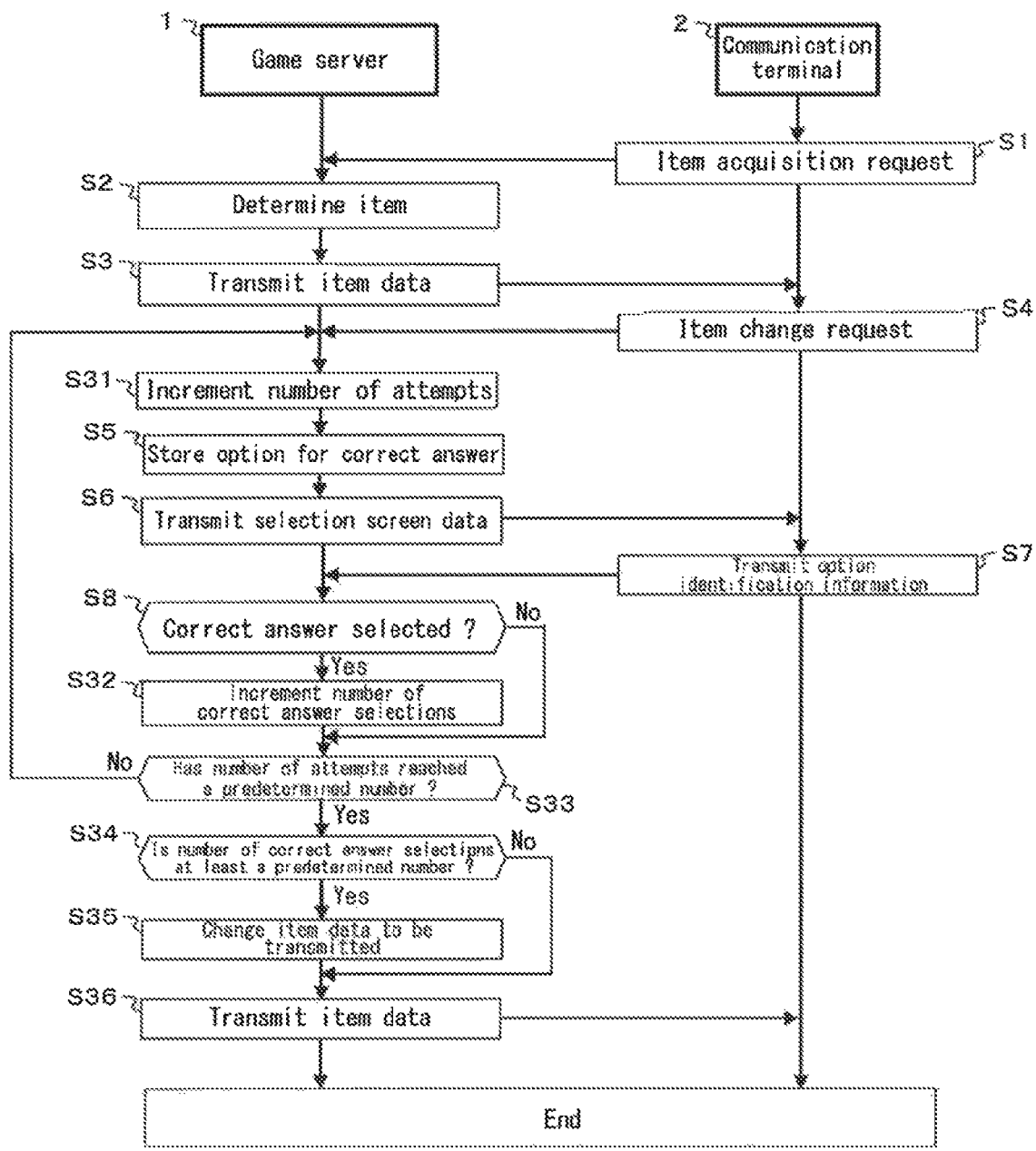
FIG. 11 is a flowchart illustrating operations of the communication system according to Embodiment 3.

Next, operations of the communication system according to Embodiment 3 of the present disclosure are described using the flowchart in FIG. 11. The same reference signs are provided for the same operations as in Embodiments 1 and 2, and a description thereof is omitted. In an initial state, the information 114 on the number of correct answer selections and the information 116 on the number of attempts are both reset to zero.

After steps S1 to S4, upon receiving an item change request, the control unit 12 in the game server 1 of Embodiment 3 increments the information 116 on the number of attempts in the memory unit 11 by one (step S31). The subsequent steps S5 to S8 are the same as the operations in Embodiment 1.

When the control unit 12 judges in step S8 that the content of the option in the option identification information is the correct answer, i.e. when the control unit 12 judges that the option selected by the user is the correct answer, the control unit 12 increments the information on the number of correct answer selections by one (step S32). When the control unit 12 judges in step S8 that the content of the option in the option identification information is not the correct answer, i.e. when the control unit 12 judges that the option selected by the user is an incorrect answer, processing skips step S32 and proceeds to step S33.

The control unit 12 then judges whether the information 116 on the number of attempts has reached a predetermined number (step S33). When the number of attempts is judged to have reached a predetermined number, processing proceeds to step S34. When the number of attempts is judged to be less than a predetermined number, processing returns to step S31.

When the number of correct answer selections is judged to be a predetermined number in step S33, the control unit 12 refers to the information 114 on the number of correct answer selections to judge whether the number of correct answer selections is at least a predetermined number (step S34). When judging that the number of correct answer selections is at least a predetermined number, the control unit 12 then changes the item data to be transmitted to the communication terminal 2 to the second item data (step S35) and transmits the second item data to the communication terminal 2 (step S36). Processing then terminates. Conversely, when the number of correct answer selections is judged to be less than a predetermined number, processing skips step S35 and proceeds to step S36. In other words, in this case, without changing the item data to be transmitted to the communication terminal 2, the control unit 12 transmits the first item data. Processing then terminates.

According to the communication system in Embodiment 3, upon receiving an item change request, the game server 1 transmits selection screen data with a plurality of options that include a correct answer to the communication terminal 2 multiple times and changes the item based on the number of correct answer selections, thus allowing for an increase in the variations on methods for acquiring battle cards and the like.

In step S38, when the number of correct answer selections is at least a predetermined number, the control unit 12 changes the item data to be transmitted to the communication terminal 2 to the second item data, yet alternatively, as the number of correct answer selections is higher, the control unit 12 may change the item data to second item data with a higher rarity value. This approach increases the predictability of acquisition of a card or other item with a high rarity value or the like and heightens interest in the game.

In Embodiments 1 to 3, the game server 1 may have a mode that, in response to instruction information from the communication terminal 2, allows for the correct answer to be distinguishable among the options on the selection screen. This instruction information is only allowed to be transmitted to the game server 1 when the user of the communication terminal 2 has a predetermined item. FIG. 12 illustrates an example of a selection screen in this mode. As illustrated in FIG. 12, in this mode, the user can distinguish which option image is the correct answer. The predetermined item is preferably only useable a predetermined number of times.

A computer is preferably used to function as the communication terminal 2. A program containing the processing for achieving the functions of the communication terminal 2 is stored in the memory unit of the computer, and the functions are achieved by the central processing unit (CPU) of the computer reading and executing the program.

In Embodiments 1 to 3, the game server 1 stores the item information table 111, item data table 112, and option table 113, yet the present disclosure is not limited to this configuration. For example, both the game server 1 and the communication terminal 2 may store each of the item information table 111, item data table 112, and option table 113. Furthermore, considering the performance of the game server 1 and the communication terminal 2, as well as the load for game processing, either one of the game server 1 and the communication terminal 2 may store all three of the item information table 111, item data table 112, and option table 113.

In Embodiments 1 to 3, the game server 1 and the communication terminal 2 communicate and execute processing, yet alternatively, the communication terminal 2, for example, may execute processing independently. For example, the communication terminal 2 may be configured to include the same functions as the memory unit 11 and control unit 12 of the game server 1.

Although exemplary embodiments of the present disclosure has been described based on drawings and examples, it is to be noted that various changes and modifications will be apparent to those skilled in the art based on the present disclosure. Therefore, such changes and modifications are to be understood as included within the scope of the present disclosure. For example, the functions and the like included in the various means and steps may be reordered in any logically consistent way. Furthermore, means or steps may be combined into one or divided.

What is claimed is:

1. A game server comprising:
   a control unit;
   a communication unit;
   a memory unit;
   reception means for receiving in the communication unit, from a user, a request for changing first item data in the memory unit by an operation unit of a communication terminal, wherein the request includes a designation of a first item provided to the user;
   display means for displaying, to the user on the communication terminal, a selection screen to display a plurality of options determined by the control unit when the reception means receives the request; and
   provision means for providing the user with second item data on the communication terminal when a selected option on the selection screen satisfies a predetermined condition as determined by the control unit based on values in an option table of the memory unit,
   wherein when the user has a predetermined item and a request for changing the predetermined item has been received by the reception means, the display means displays the selection screen from which whether the predetermined condition is satisfied can be distinguished, and when the user does not have the predetermined item, the display means does not display the selection screen from which whether the predetermined condition is satisfied can be distinguished.

2. The game server according to claim 1, wherein a rarity value of the second item data is higher than a rarity value of the first item data in an item information table in the memory unit.

3. The game server according to claim 1, wherein, when the selected option does not satisfy the predetermined condition of being a correct answer based on values in the option table, the game server provides the user with the first item data without changing the first item data.

4. The game server according to claim 1, wherein the game server further receives a request for changing the second item data from the user and the control unit changes item data a plurality of times based on a ranking table in the memory unit and correct answer selection information in the memory unit.

5. The game server according to claim 4, wherein the control unit on the game server counts and stores the number of times the selected option satisfies the predetermined condition of being a correct answer based on values on the option table in the memory unit, and when the number of times is at least a predetermined value, the control unit changes the item data to item data with a higher rarity value in the ranking table in the memory unit than when the number of times is less than the predetermined value.

6. The game server according to claim 4, wherein when the selected option is an incorrect answer based on values in the option table in the memory unit, the game server provides the user with the item data after changing the item data to the first item data.

7. The game server according to claim 1, wherein the reception means is further configured to receive, from the user, an item acquisition request, prior to receiving the request for changing first item data in the memory unit; and
   wherein the provision means is further configured to randomly select, from a plurality of item options, first item data, and provide the user with the first item data, prior to receiving the request for changing first item data in the memory unit.

8. A method of controlling a game server, comprising:
   receiving, from a user on an operation unit of a communication terminal, a request for changing first item data at a communication unit of the game server, wherein the request includes a designation of a first item provided to the user;

displaying, to the user on a display unit of the communication terminal, a selection screen of data generated by a control unit of the game server that displays a plurality of options from an item data table of a memory unit of the game server, when the request is received; and providing the user with second item data when a selected option on the selection screen satisfies a predetermined condition as determined by the control unit of the game server based on information stored in an option table in the memory unit, wherein when the user has a predetermined item and a request for changing the predetermined item has been received from the user, the method further comprises displaying the selection screen from which whether the predetermined condition is satisfied can be distinguished, and when the user does not have the predetermined item, the method further comprises preventing the display of the selection screen from which whether the predetermined condition is satisfied can be distinguished.

9. The method according to claim 8, wherein a rarity value of the second item data stored in an item information table is higher than a rarity value of the first item data stored in the item information table.

10. The method according to claim 8, wherein when the selected option does not satisfy the predetermined condition of being a correct answer as determined by the control unit, the game server provides the user with the first item data without changing the first item data.

11. The method according to claim 8, wherein the game server further receives a request for changing the second item data from the user through the communication unit and the control unit changes item data a plurality of times based on values in a ranking table and correct answer selection information in the memory unit.

12. The method according to claim 11, wherein the control unit on the game server counts and stores the number of times the selected option satisfies the predetermined condition of being a correct answer based on values in the option field in the memory unit, and when the number of times is at least a predetermined value, changes the item data to item data with a higher rarity value in the ranking table than when the number of times is less than the predetermined value.

13. The method according to claim 11, wherein when the selected option is an incorrect answer based on values in the option table in the memory unit, the game server provides the user with the item data after changing the item data to the first item data.

14. The method according to claim 8, further comprising:
receiving, from the user on the communication terminal, an item acquisition request, prior to receiving the request for changing first item data in the memory unit;
randomly selecting, with the game server, from a plurality of item options, first item data; and
providing the user with the first item data, prior to receiving the request for changing first item data in the memory unit.

15. A computer-readable non-transitory recording medium having recorded thereon instructions to be executed by a computer, the instructions causing the computer to execute the steps of:
receiving, from a user on a communication terminal, a request for changing first item data at a communication unit on a game server, wherein the request includes a designation of a first item provided to the user;

displaying, to the user on a display unit of the communication terminal, a selection screen to display a plurality of options determined by a control unit on the game server from data in an item data tables in a memory unit of the game server when the request is received; and providing the user with second item data from an item information table in the memory unit of the game server when a selected option on the selection screen of the communication terminal satisfies a predetermined condition as determined by the control unit based on values stored in an option table of the memory unit, wherein when the user has a predetermined item and a request for changing the predetermined item has been received from the user, the display unit displays the selection screen from which whether the predetermined condition is satisfied can be distinguished, and, when the user does not have the predetermined item, the display unit does not display the selection screen from which whether the predetermined condition is satisfied can be distinguished.

16. The computer-readable non-transitory recording medium according to claim 15, wherein a rarity value of the second item data in the item information table is higher than a rarity value of the first item data in the item information table.

17. The computer-readable non-transitory recording medium according to claim 15, the instructions further causing the computer to execute the step of, when the selected option is not determined by the control unit to satisfy the predetermined condition of being a correct answer in the option field, providing the user with the first item data from the item data table and item information table in the memory unit without changing the first item data.

18. The computer-readable non-transitory recording medium according to claim 15, the instructions further causing the computer to execute the step of receiving a request at the communication unit of the game server for changing the second item data from the user and the control unit changing item data a plurality of times based on values stored in a ranking table and correct answer selection information in the memory unit.

19. The computer-readable non-transitory recording medium according to claim 18, the instructions further causing the computer to execute the step of counting the number of times the selected option satisfies the predetermined condition of being a correct answer based on correct answer selection information in the memory unit, and when the number of times is at least a predetermined value, changing the item data provided to the user on the communication terminal to item data with a higher rarity value in the ranking table than when the number of times is less than the predetermined value.

20. The computer-readable non-transitory recording medium according to claim 15, the instructions further causing the computer to execute the steps of:
receiving, from the user on the communication terminal, an item acquisition request, prior to receiving the request for changing first item data in the memory unit;
randomly selecting, from a plurality of item options, first item data; and
providing the user with the first item data, prior to receiving the request for changing first item data in the memory unit.

21. A computer-readable non-transitory recording medium having recorded thereon instructions to be executed by a computer, the instructions causing the computer to execute the steps of:
- receiving, from a user on a communication terminal, a request for changing first item data, wherein the request includes a designation of a first item provided to the user;
- displaying, to the user on a display unit of the communication terminal, a selection screen to display a plurality of options determined by a control unit on the communication terminal from data in an item data tables in a memory unit of the communication terminal when the request is received; and
- providing the user with second item data from an item information table in the memory unit of the communication terminal when a selected option on the selection screen of the communication terminal satisfies a predetermined condition as determined by the control unit based on values stored in an option table of the memory unit,
- wherein when the user has a predetermined item and a request for changing the predetermined item has been received from the user, the display means displays the selection screen from which whether the predetermined condition is satisfied can be distinguished, and when the user does not have the predetermined item, the display means does not display the selection screen from which whether the predetermined condition is satisfied can be distinguished.

* * * * *